United States Patent [19]

Muller

[11] Patent Number: 5,529,317
[45] Date of Patent: Jun. 25, 1996

[54] FLOATING RING SEAL WITH RETURN STRUCTURES AND PROCESS FOR MAKING IT

[75] Inventor: Heinz K. Muller, Waiblingen, Germany

[73] Assignee: Flexibox Limited, Manchester, United Kingdom

[21] Appl. No.: 157,208

[22] PCT Filed: May 29, 1992

[86] PCT No.: PCT/EP92/01198

§ 371 Date: Dec. 10, 1993

§ 102(e) Date: Dec. 10, 1993

[87] PCT Pub. No.: WO92/22760

PCT Pub. Date: Dec. 23, 1992

[30] Foreign Application Priority Data

Jun. 12, 1991 [DE] Germany ............................ 41 19 324.5
Mar. 24, 1992 [DE] Germany ............................ 42 09 484.4

[51] Int. Cl.⁶ .................................................... F16J 15/34
[52] U.S. Cl. .......................................... 277/96.1; 277/81 R
[58] Field of Search .......................... 277/96, 96.1, 81 R, 277/82, 96.2

[56] References Cited

U.S. PATENT DOCUMENTS

| | | | |
|---|---|---|---|
| 3,640,541 | 2/1972 | Taschenberg | 277/96 |
| 3,822,066 | 7/1974 | Keys | 277/96 |
| 4,407,513 | 10/1983 | Takenaka | 277/96.1 |
| 5,090,712 | 2/1992 | Pecht et al. | 277/96.1 |

FOREIGN PATENT DOCUMENTS

| | | |
|---|---|---|
| 37210 | 10/1981 | European Pat. Off. . |
| 298324 | 1/1989 | European Pat. Off. . |
| 369295 | 5/1990 | European Pat. Off. . |
| 1.597.609 | 8/1970 | France . |
| 1475621 | 1/1969 | Germany . |
| 1964150 | 7/1970 | Germany . |
| 2108945 | 10/1971 | Germany . |
| 2928504C2 | 1/1981 | Germany . |
| 3619489C2 | 12/1987 | Germany . |
| 3722303A1 | 1/1989 | Germany . |
| 3835794 | 4/1990 | Germany . |
| 3839106 | 5/1990 | Germany . |
| 0161368 | 10/1982 | Japan ..................................... 277/96.1 |
| 1541451 | 2/1990 | U.S.S.R. ................................. 277/96.1 |

OTHER PUBLICATIONS

H. K. Müller, "Hydrodynamische Dichthilfen" bei Hochleistungs–Gleitringdichtungen, Abdichtung bewegter Maschinenteile, pp. 123–126 (no date available).

H. K. Müller, "Fluid Film Sealing," ASLE Education Course, May 1972, Houston, Texas.

Laurenson et al., "A Slot Fed Multirecess Hydrostatic Seal," Paper G2, 6th International Conference on Fluid Sealing, Feb. 27–Mar. 2, 1973, Munich, Germany.

*Primary Examiner*—Daniel G. DePumpo
*Attorney, Agent, or Firm*—Woodard, Emhardt, Naughton, Moriarty & McNett

[57] ABSTRACT

In order to return the fluid which has penetrated into the sealing gap of a floating ring seal, recesses with closed edges are machined inside the region permanently covered by the sealing surfaces in a sealing ring in which the fluid is drawn to an end of the recess very close to the chamber to be sealed and hydrodynamically taken to a high pressure. Mirror-image recesses are effective regardless of the direction of rotation. The recesses are machined in very small sliding surfaces of ceramic sealing rings using a laser beam. Such a floating ring seal has a relatively low leakage rate with low friction. Two fluids can be mutually sealed with a double recess array.

35 Claims, 5 Drawing Sheets

FLOATING RING SEAL WITH RETURN STRUCTURES AND PROCESS FOR MAKING IT

The invention relates to a sliding ring seal, in the end side sealing faces of which there are made depressions, each depression having an endless edge within the region constantly covered by the sealing faces, the fluid which has penetrated between the sealing faces into the depressions from the space to be sealed being entrained by the rotating sliding face and both put under greater pressure and also brought as close as possible to the space to be sealed, so that the fluid flows back into the space to be sealed again, out of the depressions.

Generally, sliding ring seals seal a fluid (liquid or gas) by countering the fluid to be sealed with a high flow resistance produced by a very narrow sealing gap between their end side sealing faces, as a result of which the leakage flow penetrating through the gap is small. So that the sealing gap can always be kept very narrow during operation of a sliding ring seal, the axially movable sealing ring is pressed against the other sealing ring both by means of springs and by the pressure of the fluid to be sealed. Although the fluid penetrates into the sealing gap under capillary action, and possibly as a result of a difference in pressure, it can occur that the sealing faces touch one another in some regions temporarily, thus become heated and wear. In order to prevent disadvantages resulting from this, namely the failure of the seal as a result of overheating, fissure formation, decomposition of the fluid in the sealing gap and the formation of deposits, excessive wear, etc., there are in accordance with the prior art a plurality of measures which have the aim of producing and maintaining a load-bearing fluid pressure in the sealing gap and in this way of reliably separating the sealing faces and thus stably establishing a narrow sealing gap. These measures can be divided into the terms "hydrostatic" and "hydrodynamic" gap pressure production. In the case of hydrostatic gap pressure production, measures are taken which alter the average value of the pressure decreasing in the sealing gap from the pressure level in the space to be sealed to the pressure level of the surrounding space. In the hydrodynamic gap pressure production, measures are taken as a result of which the fluid which is entrained by the sealing face of the rotating sealing ring in the sealing gap is accumulated at local gap-narrowing locations, as a result of which the fluid pressure is increased, as in the case of a hydrodynamic sliding bearing. However, an increase in the gap pressure has a disadvantage which is considerable from a sealing technology point of view, namely an increase in the sealing gap with the consequence of an increase, often to a considerable extent, of leakage. With regard to environmental protection, however, there is nowadays a general wish to reduce leakage drastically and reliably in all sliding ring seals which seal "problem fluids". In order to stem leakage from hydrodynamically lubricated sliding ring seals, there are in accordance with the prior art special constructions, in which the fluid flow penetrating from the space to be sealed into the sealing gap is guided by means of particular structuring of the sealing faces such that some of it flows back into the said space. Disadvantages of known constructions having this mode of operation are their structure, which is complicated from a production point of view, the relatively large radial width of the sealing faces which is necessary because of production of the structures, and the fact that the depressions are open to the low-pressure side, as a result of which in principle leakage occurs with certain structural types when the shaft is at a standstill and there is a risk with other structural types that even small deformations of the sealing faces result in considerable leakage. In some constructions, the fluid is entrained in the wrong direction in partial regions of the sealing edge and leakage is thus produced. Another disadvantage of known constructions is the fact that their return action only functions in one direction of rotation of the shaft. Finally, there are also known sliding ring seals in which spiral grooves pump fluid out of the space on the low-pressure side into the space to be sealed. However, this property goes against the object of the present invention.

For a number of reasons of sealing technology, not least to reduce the energy loss caused by friction, modern sliding ring seals have very narrow sliding faces, with a radial width of two millimeters or less. The gap height of a sliding ring seal which is established in operation, the axial spacing between the sealing faces, is, from the point of view of avoiding leakage, most favourable when it is not substantially greater than the remaining unevenness of the sealing faces which have been lapped plane. The gap heights are thus generally in the order of magnitude of a micrometer. Hydrodynamically acting depressions in the sliding faces function as pressure-producing or as returning structures to the optimum only if their depth is of the same order of magnitude as the height of the sealing gap surrounding them.

There thus arise the basic objects, in the case of sliding ring seals, in particular those with a small sliding face width, first of preventing wear and overheating of the sealing faces by means of hydrodynamic lubrication, second of returning hydrodynamically to the first space to be sealed the fluid which has penetrated into the sealing gap, and third of keeping leakage as small as possible when the shaft is at a standstill. Here, it is desirable for the sealing parts which achieve the objects to be capable of being produced reliably and economically and for them to function as far as possible equally in both directions of rotation of the shaft. In cases where a respective fluid is located in the space to be sealed and in the surrounding space, and the two—similar or different—fluids have to be kept separate from one another reliably, there is a desire to convey the fluid which has respectively penetrated into the sealing gap from one of the two spaces back into the same space, and this function should as far as possible also be effective in both directions of rotation of the shaft.

These objects are achieved by means of depressions which are structured in accordance with the invention and which are made in at least one of the radial sealing faces of the sliding ring seal. A sliding ring seal for sealing the place at which a revolving shaft passes through a wall which separates a sealed space containing the fluid to be sealed from a second space, a higher pressure generally prevailing in the sealed space than in the second space, has a first sealing ring, which is held non-rotatably against the wall and is sealed off with respect thereto and which has a planar first end face lying radially with respect to the shaft axis and delimited by an outer edge and an inner edge, and a second sealing ring, which is held non-rotatably against the shaft and is sealed off with respect thereto and which has a planar second end face lying radially with respect to the shaft axis and delimited by an outer edge and an inner edge. The two end faces touch each other when the shaft is stationary and form a narrow sealing gap when the shaft rotates. One of the sealing rings is movable in the direction of the shaft axis and can be pressed against the other sealing ring. Generally, the pressure is effected by means of spring force and by the action of the overpressure prevailing in the sealed space.

To describe the inventive features of the sealing ring seal, first the following terms are defined: a sealed space 31, a second space 32, a sealing zone 35, two delimitation circles, a sealing circle 33, a zone circle 34, a sealing zone width B, a centre circle 36, a first radial line 116, a second radial line 115, a return point 46, a sealing section 411, a zone section 412, a return circle 461, a first reference face F1 and a second reference face F2.

The space in which the fluid to be sealed is located is the sealed space 31. The surrounding space, which is separated from the sealed space by the sealing gap 13, is designated second space 32. The annular sealing zone 35 is the zone which is constantly covered by both end faces 113, 213 of the sealing rings 11, 21 during rotation of the shaft. The sealing zone is bounded by two delimitation circles whereof the centre points lie on the shaft axis 114. The radius of one of the two delimitation circles is equal to the spacing between the shaft axis and the point which is closest to the shaft axis of one of the outer edges 111, 211 of the sealing rings. The radius of the other delimitation circle is equal to the spacing between the shaft axis and the point which is furthest from the shaft axis of one of the inner edges 112, 212. The delimitation circle which is closer to the sealed space is designated the sealing circle 33, and the other is designated the zone circle 34. Generally, the outer edges and the inner edges of the end faces of the two sealing rings are circles. In this case, the sealing zone is located between the respectively largest inner edge and the respectively smallest outer edge of one of the two sealing rings. The sealing zone width B is the spacing between the two delimitation circles. The centre circle 36 is concentric with respect to the delimitation circles, and its radius is equal to the arithmetic mean of the radii of the delimitation circles.

In at least one of the sealing rings a plurality of depressions 4 are made from the end face thereof within the sealing zone 35, each depression having an edge 41 which is endless: on the end face. A radial line 115 intersecting the shaft axis touches the edge of the depression on the one side; a radial line 116 touches the edge of the depression on the other side. The radial lines therefore enclose the depression. Both radial lines 115, 116 lie in the plane of the end face. Here, each radial line can touch the edge of the depression at a single touching point or at a plurality of touching points. However, there is on each of the two radial lines 115, 116 a respective touching point 45, 46 which is closest to the sealing circle. These two touching points 45, 46 divide the edge of the depression into two edge sections. The edge section facing the sealing circle is the sealing section 411, and the other is the zone section 412. If the two touching points 45, 46 are not at the same spacing from the sealing circle, then the touching point which has the smallest spacing from the sealing circle in absolute terms is designated the return point 46 and the radial line on which the return point 46 is located is designated the first radial line 116. A return point 46 has the spacing A from the sealing circle. The other touching point 45 lies on the second radial line 115. The circle whereof the centre point lies on the shaft axis and which passes through the return point 46 is called the return circle 461. If both touching points 45, 46 are at the same spacing from the sealing circle, there are two return points. In particular, if the depression 4 is mirror-symmetrical in relation to a radial and thus both touching points 45, 46 are at the same spacing from the sealing circle, then consequently the return circle passes through both touching points 45, 46.

The first reference face F1 is bounded by the return circle 461, the sealing section 411 and the radial line 115 intersecting the other touching point 45. The area of the first reference face F1 is calculated negatively where the sealing section 411 lies between the sealing circle 33 and the return circle 461. The area of the first reference face F1 is calculated positively where the return circle 461 lies between the sealing circle 33 and the sealing section 411. The second reference face F2 is bounded by the return circle 461, the zone section 412 and the second radial line 115, and its area is calculated positively. The connection line between the point of intersection 117 of the end face plane and the shaft axis, and any point 40 of the zone section 412 is designated the radius vector 110.

According to the invention, all the stated objects are together achieved by means of the depressions 4 made in the end faces in that their edges lie completely within the sealing zone, in the depressions the entraining action of the rotating sliding face bringing the fluid as close as possible to the sealing circle and at the same time putting it hydrodynamically under higher pressure so that the fluid flows back into the sealed space at a small flow resistance, in accordance with the invention the ratio of the spacing A from the sealing zone width B being in the range $0.001 \leq (A/B) \leq 0.2$, as a result of which the return point has a very small spacing A from the sealing circle, and at the same time the ratio of the first reference face to the second reference face of each depression being in the range $-0.3 \leq (F1/F2) \leq +0.9$, as a result of which the fluid within the depression is guided in functionally favourable manner to the return point. The range of A/B takes into account the span of the radial sealing zone widths B which are usual in practice.

The arrangement, known per se, of hydrodynamically active depressions within the sealing zone and without connection to the sealed space has the advantage that when the shaft is at a standstill a lower pressure prevails in the depressions than in the sealed space. In contrast to known depressions which have a return capability and which are connected to the second space, the arrangement according to the invention of the depressions which have a return capability has the essential advantage that the very narrow sealing gap, which is formed only by the small unevennesses of the end faces when the shaft is at a standstill, is located between the depressions and the second space. As a result, the risk of leakage when the shaft is at a standstill is hardly greater with the sliding ring seal according to the invention than with a sliding ring seal without depressions and having the same sealing zone width B. The depressions are preferably arranged between the sealing circle and the centre circle so as to make the flow resistance between the zone section of a depression and the second space as large as possible as a result.

A spacing A different from zero must be present so that a high pressure, which favours both the return action and the lubrication of the sliding faces, can be produced hydrodynamically in the region of the return point 46 by the entraining action of the rotating sliding face. The spacing A is at most 0.5 mm, and preferably smaller than 0.1 mm. With well centred and precisely machined sealing rings, for example, a spacing A of approximately 10 micrometers can be realized and produces an excellent return action. A good compromise between manufacturing expense and return action is achieved in the range A=50 to 100 micrometers.

In order to avoid increased inward flow from the sealed space directly into a depression with return capability according to the invention, preferably no point on the sealing section 411 is closer to the sealing circle 33 than the return point 46, as a result of which F1 generally has a positive sign and consequently preferably $0 \leq (F1/F2) \leq 0.9$. A particularly favourable return action is produced if, on average, the fluid in the depression is brought to the return circle at a small angle. For this purpose the ratio is preferably in the range $0.1 \leq (F1/F2) \leq 0.5$.

If the sealing circle is larger than the zone circle and the sealed space thus surrounds the sliding ring seal, with a small spacing A according to the invention of the return point from the sealing circle the return action is particularly favourable if according to the invention the sealing section is shorter than the zone section. An equally favourable return action in both directions of rotation of the shaft is achieved according to the invention in that the depressions are mirror-symmetrical in relation to a radial. A favourable return action is also achieved in that the zone section is shaped such that the radius vector rotates in at most one direction when moving over the zone section. This means that at the zone section recessed dents and projecting tongues of the depression are eliminated and that thus in the region of the zone section—other than at the sole projecting place at the return point—there is no local excessive increase in pressure with its attendant increased emergence of fluid from the depression into the sealing gap.

Preferably, a depression according to the invention comprises at least two hollows of different lengths, the respectively longer hollow having a smaller spacing from the sealing circle than any smaller hollows, that the hollows adjoin one another along parts of their longitudinal edges such that the cavities formed by the hollows and the constant sealing face merge with one another. By hollows there is substantially meant an elongate depression which has substantially a right-angled cross-section. The hollows are arranged substantially such that their longitudinal extent runs chiefly tangentially, that is to say in the direction of the tangent on a circle lying on the sealing face and having its centrepoint on the shaft axis. At least one of the ends of the longest hollow on which the return point lies has, according to the invention, a small spacing of less than 0.5 mm from the sealing circle. The result of each of these measures is that the fluid which is in the hollow and is entrained by the sealing face, which rotates relative to the sealing face provided with the depressions, accumulates at the rear end of a hollow—as seen in the direction of entrainment—and overflows into the adjacent hollow. The arrangement of the hollows relative to the sealed space has the effect that the fluid, in the manner of a cascade, finally reaches the hollow which is closest to the first space. The fluid entrained in this hollow in the longitudinal direction thereof is accumulated towards the end of this hollow, where there is no further adjacent hollow. As a result and depending on the rate of entrainment, the viscosity and depth of the hollow, the pressure of the fluid is increased considerably towards the end of this hollow. This end has a very small spacing from the sealing circle, in accordance with the invention. As a result, the distance and thus also the flow resistance between the end of this hollow and the sealed space is small within the sealing gap, as a result of which a large proportion of the fluid flowing out of this hollow flows into the sealed space.

Preferably, the mutually adjoining hollows are of different depths such that the longest hollow has the smallest depth and the shortest hollow has the greatest depth, the cavities formed by the hollows and the constant sealing face each merging with a step in the regions in which hollows adjoin one another. Preferably, in a region in which two hollows adjoin one another, the respectively less deep hollow lies closer to the sealing circle, or in other words, as seen from the sealed space, a respectively more distant hollow is deeper than a less distant one. Exceptions to this rule, which is preferably to be adhered to, are appropriate if it appears favourable to provide deeper hollows in between for the purpose of collecting and storing foreign bodies which have penetrated into the sealing gap or abrasion, reaction, precipitation or coking products which have arisen in the gap.

The hollow having the smallest depth is preferably between 0.2 micrometers and 5 micrometers deep, and the height of a step—equal to the difference in depths of two mutually adjoining hollows—is preferably between 0.2 micrometers and 5 micrometers. The width and the depth of individual hollows can be variable in the longitudinal direction of the hollow. Preferably, the width of a hollow is between 0.05 and 0.2 millimeters. Preferably, the depth of at least one of the hollows, as seen in its longitudinal direction, lessens towards at least one of its ends. Preferably, the depth of the hollow whereof the end is closest to the sealing circle lessens towards this end. As a result, the pressure at the end of this hollow becomes particularly great and the return action is particularly intensive and favourable.

Preferably, at least one longitudinal edge of at least one hollow is curved, the centre point of the curvature lying on the side of the sealed space. This embodiment is particularly advantageous if the smaller of the two delimitation circles is the sealing circle. As a result of the curvature of at least the hollow lying closest to the gap edge, the effect in this case is that at least one end of this hollow has a very small spacing A from the sealing circle. In another favourable embodiment of the sliding ring seal according to the invention, the longitudinal edges of the hollows are straight lines which form a minimum angle $\alpha$ of preferably between 70° and 90° with a radial drawn through any point on a longitudinal edge. In a particularly advantageous embodiment which is suitable for both directions of rotation of the shaft, the hollows are arranged to be mirror-symmetrical in relation to a radial.

In the case of a further type of the sliding ring seal according to the invention, the edge sections of the depressions are polygonal figures comprising straight and/or curved sections. In the case of a sliding ring seal which is acted upon by pressure from the outside, in which therefore the sealing circle is larger than the zone circle, the sealing section is preferably a single straight line and the zone section is a curve or a polygonal figure comprising at least two straight lines. In an embodiment which is particularly favourable for manufacturing, and which is produced for example by an end-side incision of a circular-cylindrical tool which is set with its cylinder axis oblique in relation to the end face, the edge of the depression has the shape of an ellipse section whereof the chord is the sealing section. In a further preferable embodiment, the edge of the depression has the shape of a triangle whereof the longest side is the sealing section. Preferably, the depth of the depressions is variable in such a way that they have the least depth in the region of their sealing section. Preferably, the base of the depressions is formed by a planar face inclined toward the end face. The maximum depth t of the depression is preferably between 1 and 10 micrometers. These preferable edge shapes—ellipse section or triangle—are again preferably mirror-symmetrical in relation to a radial, as a result of which they have the same return action in both directions of rotation of the shaft. If, when using depressions having a mirror-symmetrical edge, a somewhat differing conveying action is desirable with anticlockwise and clockwise movement of the shaft, then the chord or the longest triangle side forms an angle different from 90°, preferably between 70° and 89°, with a radial drawn through its centre.

In order to hydrodynamically lubricate the sealing faces and to stabilize the sealing gap, preferably, in addition to the depressions having return capability, in a manner known per se in the end face of at least one sealing ring there are made additional depressions which extend radially at least as far as the sealing circle, so that during the relative rotation of the two sealing rings the cavities formed by the additional depressions together with the end face of the other sealing ring are at least sometimes connected to the sealed space. According to the invention, an additional depression is preferably between 1 micrometer and 20 micrometers deep. An additional depression, in conjunction with the definition of the sealing zone, is a part of the end face in which the additional depression is made, that is to say the position of the delimitation circles is not altered by the existence of additional depressions. In order to maintain an advantageous symmetrical distribution of the hydrodynamic fluid pressure over the sealing surface, preferably at least two additional depressions are arranged at the same spacing from the shaft axis and in each case with the same angular spacing on the periphery. Preferably, at least one additional depression is arranged between two neighbouring depressions having a return capability according to the invention.

Finally, for the purpose of separating two different fluids which surround the sealing rings respectively on the outside and on the inside, the depressions 4 are in accordance with the invention arranged such that each fluid is separately conveyed back into the space from which it flowed into the gap. In this case, in accordance with the definition, the second space 32 is also a sealed space and consequently both delimitation circles are, in accordance with the definition, sealing circles. At the same time, at a small spacing from the second sealing circle 34 there is defined a second return circle 462 on which the return points 46 of some of the depressions lie.

So that the depressions, which according to the invention are only fractions of a micrometer to a few micrometers deep, and additional depressions cannot disappear as a result of wear of the sealing face, in accordance with the invention they are made in a sealing ring of very hard, wear-resistant material. Preferably, the sliding rings of the sliding ring seal according to the invention in which depressions are made are of ceramic material. Because of the high wear resistance, the chemical resistance and the good thermal conductivity of silicon carbide, this material is preferably used for sliding rings having the return structures according to the invention.

Depressions having a very small depth of fractions of a micrometer to a few micrometers for the purpose of optimum return action according to the invention, are made in the sealing rings preferably by means of laser beam or electron beam. In a known machining process, comparatively deep structures are made in unsintered "starting sheets" of ceramic materials by means of laser beams. In the case of the sliding ring seal according to the invention, on the other hand, the depressions according to the invention are made in the hard material of the sealing ring. In particular, the depressions according to the invention are made, in the ceramic materials which are preferably used in the prior art for sliding ring seals, according to the invention in the sintered, that is to say hard sealing rings whereof machining has already been effected by lapping plane the sealing faces. Because of the particular advantage of a direct high-precision material removal by the dissociation of chemical compounds using the high photon energy of very short-wave excimer laser beams, the depressions, which according to the invention are very small, in extremely hard materials of the sealing rings are preferably made according to the invention by means of excimer laser. Preferably, the depressions are made by means of excimer laser after the final machining of the sealing rings, in the sealing face which has already been lapped plane. Preferably, at least some of the depressions are made by repeated successive laser irradiation of the projected surface or parts of the projected surface of the depressions.

Preferably, when manufacturing elongate, hollow-shaped depressions, regions which succeed one another in the longitudinal direction of the hollow are irradiated in overlapping manner, as a result of which some partial regions are irradiated more frequently and are consequently deeper than the regions adjoining them. In accordance with the invention, this is done with the purpose of in all cases avoiding leaving a web when machining at the transition from one hollow to another. A web of this type would block the flow of the fluid in the depression and thus considerably impair the return action of the depressions. For the same reason, hollows which are mutually adjoining at their longitudinal sides are preferably irradiated in overlapping manner, as a result of which a deeper incision is produced at the transition from one hollow to another.

The invention will be explained below with reference to a series of example embodiments illustrated in the drawings, in which.

Figures 1, 1A:
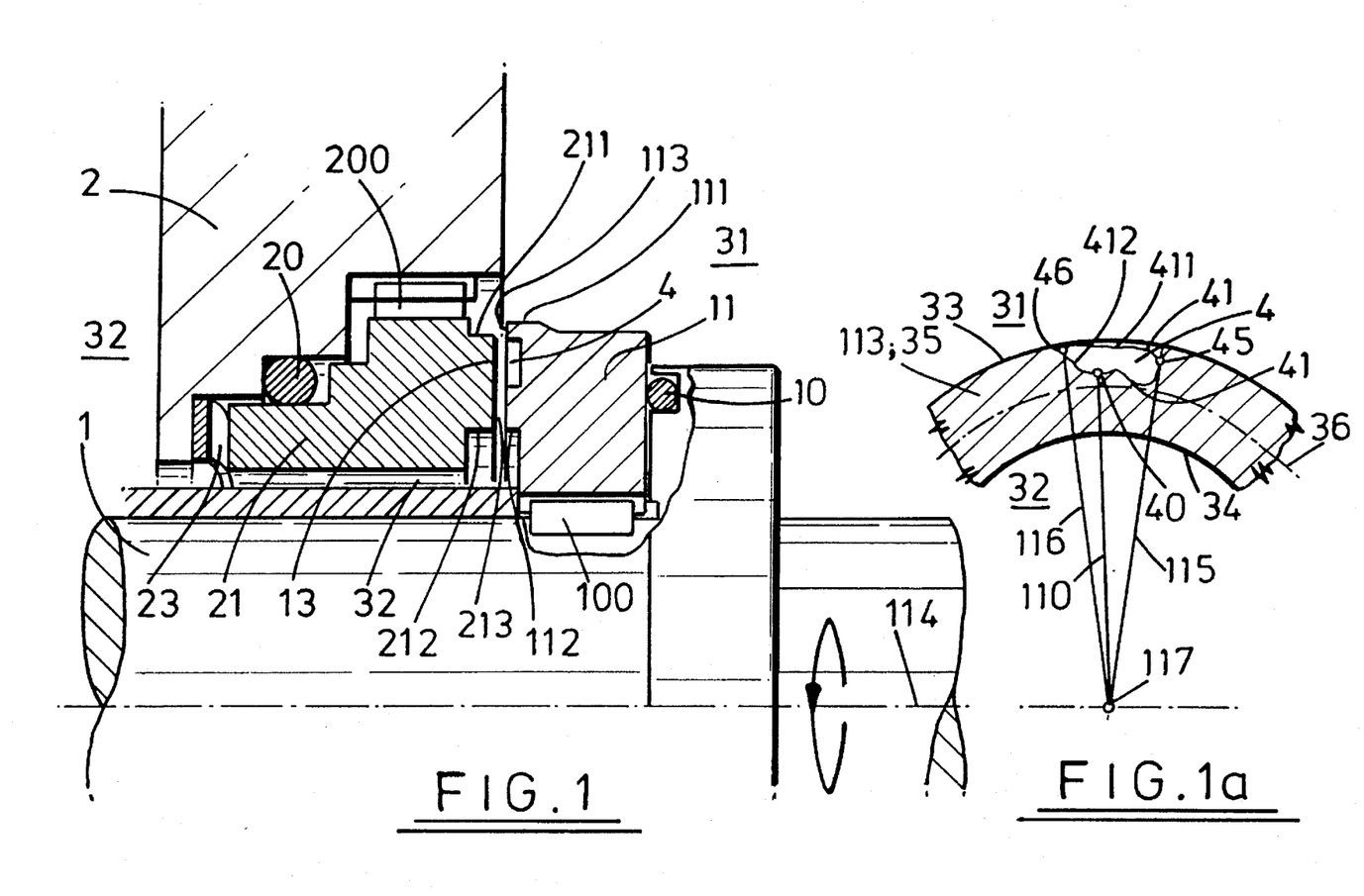
FIG. 1 shows a longitudinal section through a sliding ring seal.
FIG. 1a shows a partial view of the end face, with the illustration in principle and the designations of the edge of the depression of the sliding ring seal according to the invention.

The arrangement which is illustrated by way of example in FIG. 1 contains the basic elements and features of a sliding ring seal which seals the place at which a revolving shaft 1 passes from a sealed space 31 through a wall 2 into a second space 32, namely: an axially movable first sealing ring 21 which is held against a wall by means of a rotation-prevention element 200, is sealed therefrom by a static sealing element 20 and has an end face 213; a second sealing ring 11 which is held against the shaft by means of a rotation-prevention element 100, is sealed off therefrom by a static sealing element 10 and has an end face 113; a depression 4; a spring 23 acting axially on the first sealing ring; and with a sealing gap 13 which is established between the end faces in operation.

FIG. 1a shows a partial view of the end face of the sealing ring 11 according to the invention from FIG. 1, with an illustration in principle of a depression 4 made in the sealing ring. The part of the end face 113 which is shown shaded in in FIG. 1a is the sealing zone 35. It is the zone which is covered by both end faces at all times when the shaft rotates, and it lies between the sealing circle 33 and the zone circle 34. If the outer edges and inner edges of the sealing rings are made to be circular and concentric to the shaft axis, then the sealing circle 33 is identical to the smaller of the two outer edges 111, 211, and the zone circle is identical to the larger of the two inner edges 112, 212. The centre circle 36 lies in the centre of the sealing zone. The edge 41 of the depression is touched on the left by the first radial line 116, at the touching point 46. On the right, the second radial line 115 touches the edge along a straight section of the edge. The point on the part of the edge which is touched in a straight line which has the smallest spacing of all the points of this straight section from the sealing circle 33 is by definition the other touching point 45. Of the two touching points, the touching point 46 has the smallest spacing from the sealing circle 33 and is thus by definition the return point 46. Between the touching points 45 and 46, the sealing section 411 extends on the side of the sealing circle 33, and the zone section 412 extends on the side of the zone circle 34. The radius vector 110 is the connection line between the point of intersection 117 of the sealing face plane and the shaft axis and any point 40 on the zone section 412.

In the sealing arrangement shown in FIGS. 1 and 1a, the sealed space 31 lies, by way of example, outside the outer edges of the sealing rings 11, 21, and the second space is within the inner edges thereof. It goes without saying that the sealed space can also be on the inside and consequently the second space on the outside. In the latter case, the designations regarding the sealing circle and the zone circle in FIG. 1a have to be interchanged. The sealing circle in this case lies on the inside of the sealing zone, and according to the invention the depression is again arranged such that the return point 46 has a very small spacing A from the sealing circle.

Figures 1B, 1C, 1D:
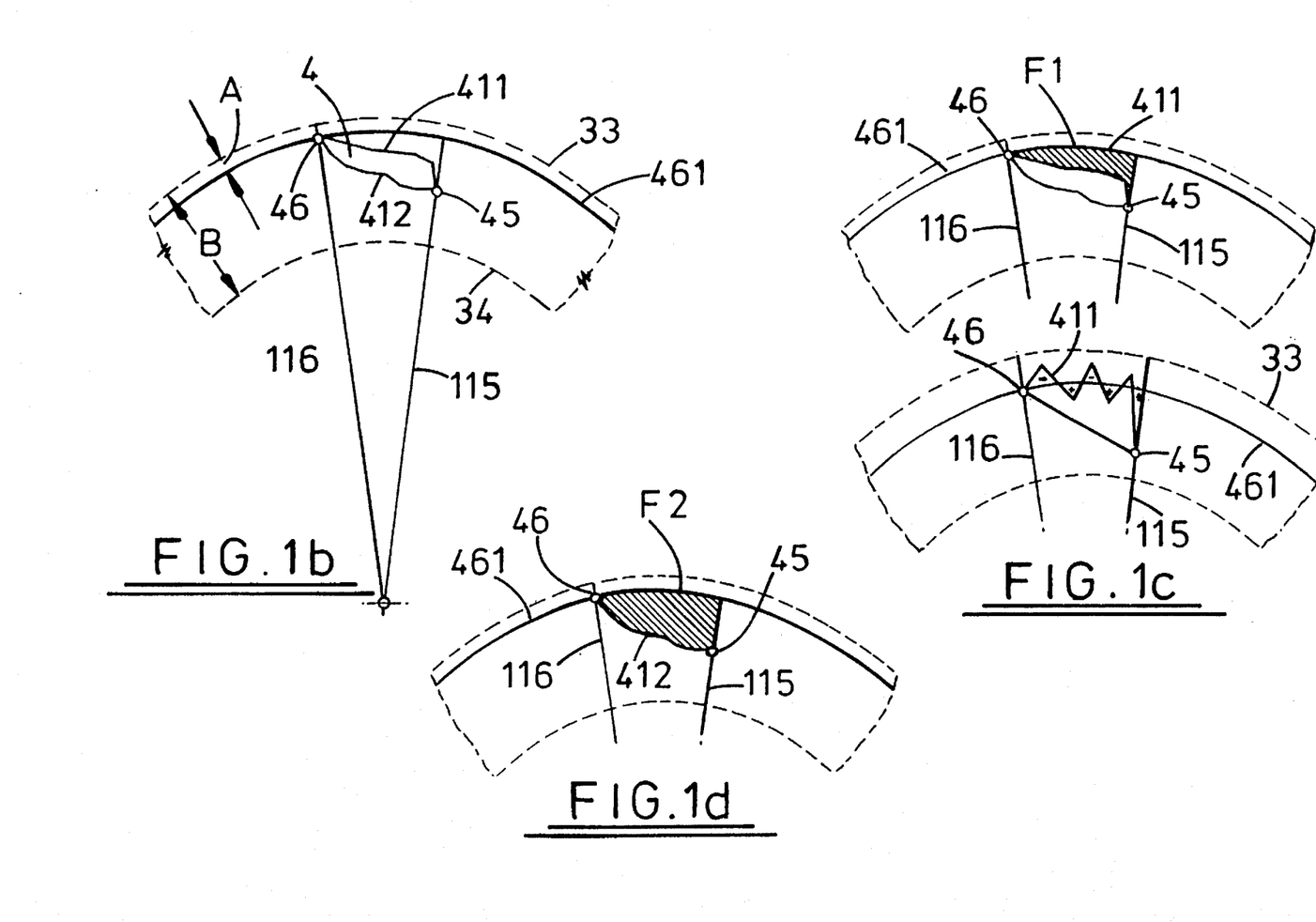
FIG. 1b shows a partial view of the end face, with the illustration in principle of the return point and of the return circle of the sliding ring seal according to the invention.
FIG. 1c shows two partial views of the end face, with the illustration in principle of the first reference face of the sliding ring seal according to the invention.
FIG. 1d shows a partial view of the end face, with the illustration in principle of the second reference face of the sliding ring seal according to the invention.

FIG. 1b shows another shape of a depression 4. The first radial line 116 passes through the return point 46, as does the return circle 461, which has the spacing A from the sealing circle 33. The spacing from the sealing circle 33 to the zone circle 34 is designated the sealing zone width B. The second radial line 115 passes through the second touching point 45. The edge of the depression has the sealing section 411 and the zone section 412.

FIG. 1c shows at the top the first reference face F1, which is enclosed by the return circle 461, the sealing section 411 and the second radial line 115. FIG. 1c shows at the bottom another shape of the edge of a depression, in which the sealing section intersects the return circle repeatedly. As a result, by definition positive and negative portions of the reference face F1 are produced.

FIG. 1d shows the second reference face F2, which is enclosed by the return circle 461, the zone section 412 and the second radial line 115. FIGS. 1c and 1d illustrate the area ratio F1/F2 and—in conjunction with the feature according to the invention that the width, as measured in the radial direction, of a depression in the vicinity of the return point is smaller than in the central region of the depression—shows the relationship between the shape of the depression and the return action.

Figure 2:
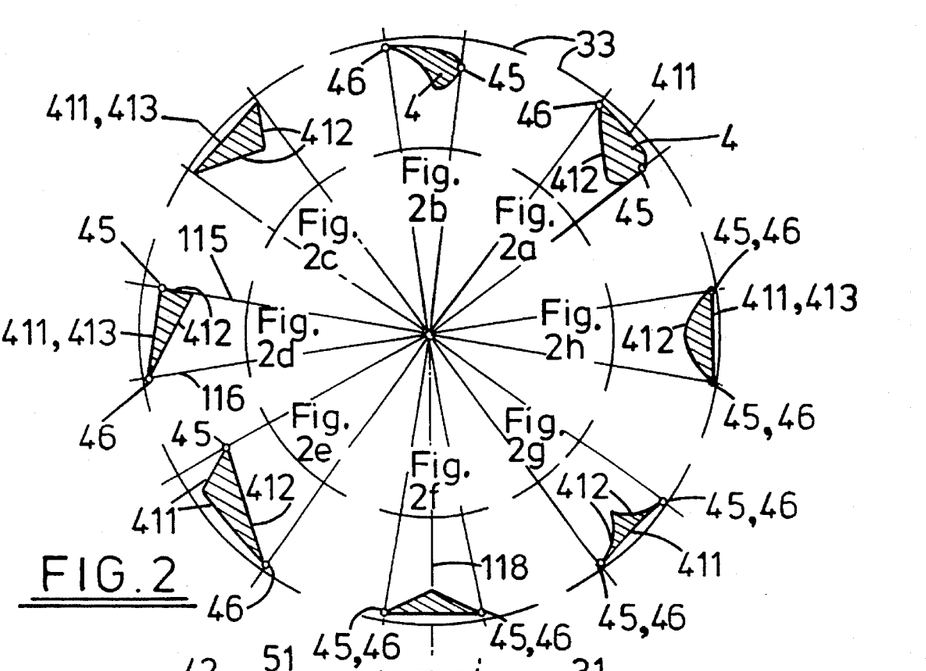
FIG. 2 shows the view of sectors of a total of 8 embodiments of the edge of the depressions of the sliding ring seal according to the invention.

FIG. 2 shows, in the FIGS. 2a to 2h which are constituents thereof, the views of a total of 8 embodiments of the depression 4 of the sliding ring seal according to the invention. For all the examples of FIG. 2, it is assumed that the sealed space 31 lies on the outside. This is generally the case with sliding ring seals. The features according to the invention are, however, readily applicable even to a sliding ring seal in which the sealed space 31 lies on the inside and the second space 32 on the outside. FIG. 2a shows a general basic shape having the edge sections 411 and 412, which are determined by the touching points 45 and 46 of the radial lines touching on either side. FIG. 2b shows a modified basic shape. The edge contours in accordance with FIGS. 2c, 2d, 2e and 2f are triangles. In FIG. 2d, the zone section extends in accordance with the definition around the inner corner to the point 45, since the shortest side of the triangle is directed radially. FIG. 2g shows an edge contour which tapers very sharply by way of the zone section 412. FIG. 2h shows a depression having an edge which has the shape of a circle segment or an ellipse segment. The embodiments in accordance with FIGS. 2f, 2g and 2h are mirror-symmetrical to a radial 118 and thus demonstrate the same properties in both directions of rotation of the shaft. In all the embodiments of the edge contour of the depressions shown in FIG. 2, according to the invention at least one of the touching points lies very close to the sealing circle 33.

Figure 3:
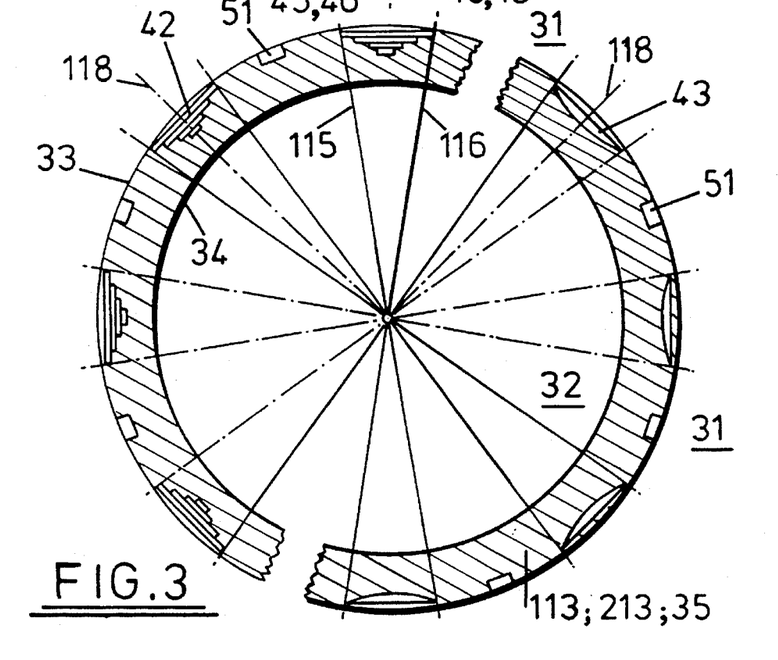
FIG. 3 shows, in two partial views, the end faces with two different embodiments of the depressions of the sliding ring seal according to the invention, with additional depressions.

FIG. 3 shows, in two partial views, the constant sealing zones 35 of the end faces 113 and 213 of two different embodiments, namely that on the right having depressions 43 whereof the edge is a circle or ellipse segment which is mirror-symmetrical to the radial 118, and that on the left having mirror-symmetrical depressions 42 which comprise a plurality of mutually adjoining narrow hollows. Additional depressions 51 which are connected to the first sealed space 31, which in this case lies on the outside, are arranged between the depressions.

Figures 4, 5:
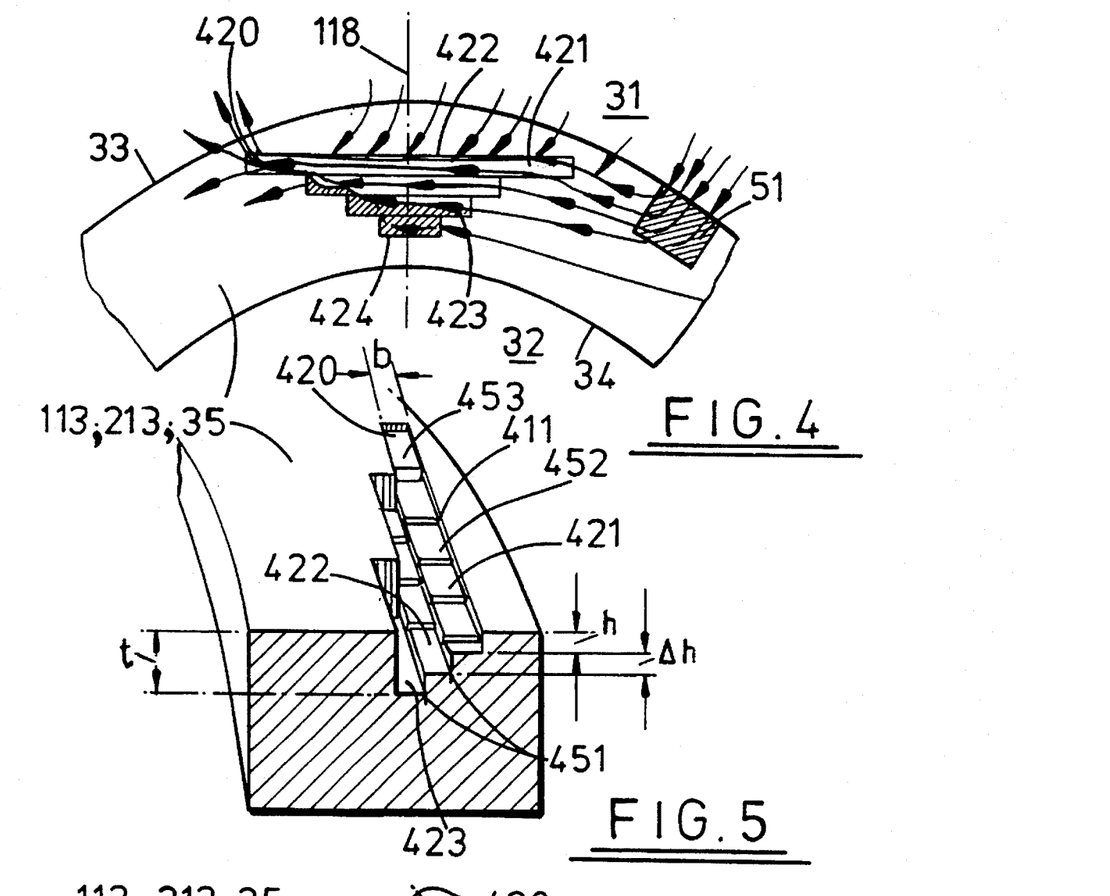
FIG. 4 shows the explanation of the flow through hollow-shaped depressions and additional depressions of the sliding ring seal according to the invention.
FIG. 5 shows, in perspective illustration, a section through a sealing ring of the sliding ring seal according to the invention, having hollow-shaped depressions.

FIG. 4 explains the flow through the depressions and additional depressions of the sliding ring seal according to the invention, using the example of flow through hollow-shaped mutually adjoining mirror-symmetrical depressions 422. Fluid from the sealed space 31 reaches the additional depression 51 which is open towards the sealing edge, and this fluid is entrained by the end face of the other sealing ring, which in relation to the additional depression slides over it, out of the additional depression into the sealing gap. There, it is entrained further over the edges of the hollows of the depression into the hollows 421, 422, 423 and 424. At the same time, fluid flows as a result of capillary action and in some cases as a result of an excess pressure in the sealed space 31 radially by way of the sealing circle 33 inwards into the sealing gap and into the hollows. As a result of axial fluctuations in the gap walls, fluid is additionally squashed into the depression, stripped off and again accumulated in the hollows by entraining action at the ends of the hollows. At the end of a respectively shorter hollow the accumulated fluid escapes laterally into the adjacent longer hollow and from there is entrained further and thus passes in the manner of a cascade finally into the longest hollow 421. At the end 420 of this hollow, which according to the invention is very shallow, there is produced a relatively high hydrodynamic pressure which can quite easily be very much greater than the pressure in the sealed space 31. Since the end 420 of the longest hollow 421 lies very close to the sealing circle 33, in accordance with the invention, the flow resistance in the gap between the end 420 of the hollow 421 and the sealed space 31 is relatively small, and a large proportion of the fluid flow which is "accumulated" and diverted by the depression passes back to the first space by way of the sealing circle 33.

FIG. 5 shows, in perspective illustration, a section through a sealing ring of the sliding ring seal according to the invention, having hollow-shaped depressions 421, 422, 423, which according to the invention are preferably produced by means of laser beams. The depth h of the shallowest and at the same time longest hollow 421 adopts, towards its end 420, an even smaller value in the region 453, as a result of which the pressure at the end of the hollow becomes extremely high. The edge of the hollow 421 is part of the sealing edge 411. The hollow 421 has the width b. The step Δh between the hollows is approximately as large as the depth of the shallowest hollow. The deepest hollow 423 has the depth t. When producing the elongate depressions, successive regions are irradiated in overlapping manner in the longitudinal direction of the hollows, as a result of which some partial regions 452 are deeper than regions of the hollows adjoining them. Similarly, hollows adjoining one another at their longitudinal sides are preferably irradiated in overlapping manner, as a result of which deeper incisions 451 are produced at the transition from one hollow to another.

Figure 6:
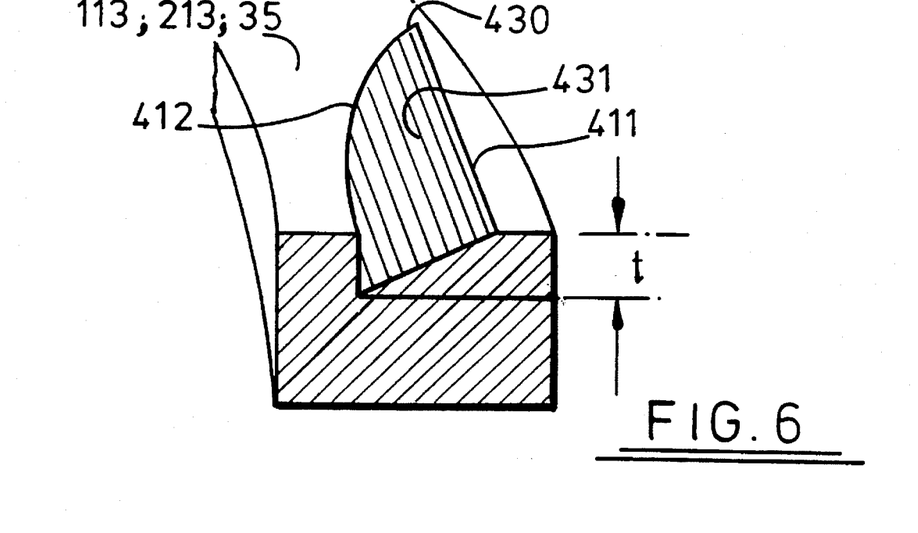
FIG. 6 shows, in perspective illustration, a section through a sealing ring of the sliding ring seal according to the invention, having depressions incised obliquely and having an elliptical edge.

FIG. 6 shows, in perspective illustration, a section through a sealing ring of the sliding ring seal according to the invention, having depressions which are incised obliquely and which have by way of an example an elliptical zone section 412. On the inside the depression is delimited by the, for example, planar face 431, and has the depth t at the deepest point. Here, the cross-section of the depression is doubly reduced in the direction of entrainment towards the end 430 in accordance with the invention, namely on the one hand the radial width and on the other hand the depth are reduced. As a result, a particularly great build-up of hydrodynamic pressure which is active for gap formation and for the return of the fluid is produced with an advantageous effect at the return point.

Figure 7:
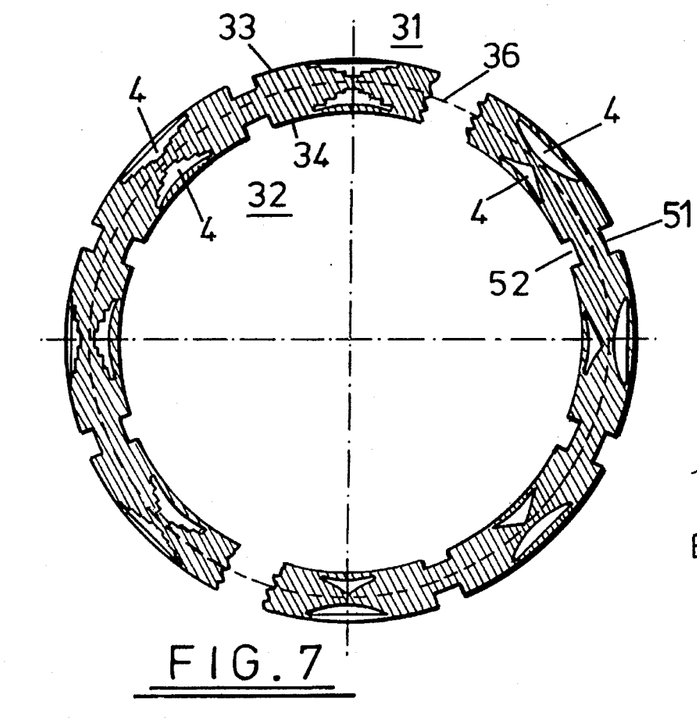
FIG. 7 shows, in two partial views, the end faces of two different embodiments having depressions on the inside and on the outside of the sliding ring seal according to the invention, for the separation of two fluids.

FIG. 7 shows, in two partial views, the constant sealing zones of two different embodiments of the sliding ring seal according to the invention as suitable for the separating sealing of two fluids, respectively located in the space 31 and in the space 32. Both inside and indeed outside the centre circle 36, depressions 4 which are in each case mirror-symmetrical to a radial made in the end faces. Between the depressions, additional depressions 51 are made on the outside and further additional depressions 52 are made on the inside, in each case connected to the adjoining spaces 31 and 32 respectively. The depressions 4 convey the fluid which comes into the gap from the respectively adjoining space by way of the respective delimitation circle—which is consequently a sealing circle—back into the same space.

Figure 8:
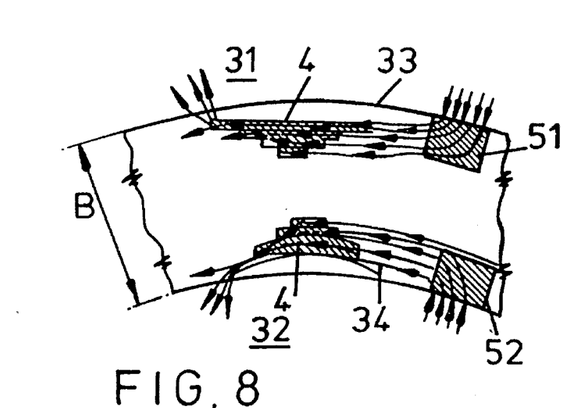
FIG. 8 shows a partial view of the end face of a sliding ring seal according to the invention, having depressions on the inside and on the outside, for the separation of two fluids.

FIG. 8 illustrates the flow through the depressions and additional depressions between the end faces of the sliding ring seal according to the invention, shown in FIG. 7 in the partial view on the left. The course of the flow is analogous to the course explained in FIG. 4. On the inside, hollow-shaped depressions 4 which have hollows which are in each case curved towards the delimitation circle are made in the end faces. As a result, it is possible in accordance with the invention to bring the ends of the hollow which is closest to the inner sealing circle 34 very close to the sealing circle 34. On the outside, the shape and function of the hollows of the depression 4 corresponds to the embodiment explained with reference to FIG. 4.

Figure 9:
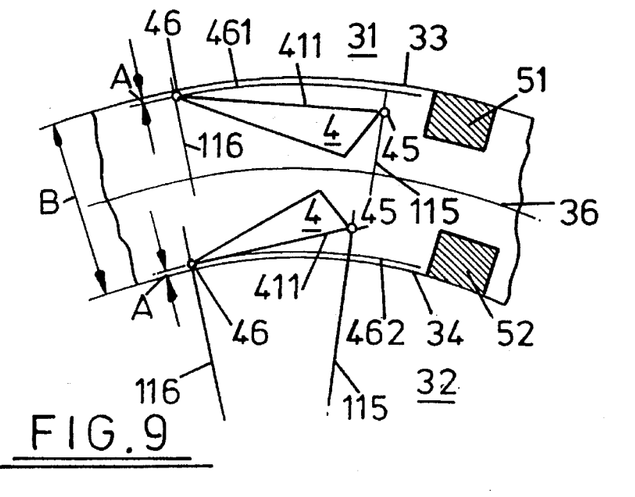
FIG. 9 shows the explanation of the flow through the depressions and additional depressions of a sliding ring seal according to the invention, having depressions on the inside and on the outside, for the separation of two fluids.

Finally, FIG. 9 shows a partial view of the constant sealing zone of a sliding ring seal according to the invention for the purpose of the separating sealing of two fluids which are respectively located in the space 31 and in the space 32. Both inside and outside the centre circle 36 there are made depressions 4 in the end face. The return point 46 of the outer depressions lies on an outer return circle 461, which has the small spacing A from the outer sealing circle 33. The return point 46 of the inner depressions lies on an inner return circle 462, which has the small spacing A from the inner sealing circle 34. The spacing between the two sealing circles is here the sealing zone width B. Between the depressions there are made additional depressions 51 on the outside and further additional depressions 52 on the inside, which are in each case connected to the adjoining spaces 31 and 32 respectively. Since in this embodiment only one of the touching points of the radial lines 115, 116, namely in each case the return point 46, lies on the respective return circle, this sliding ring seal has a return action only in one direction of rotation of the shaft. In the other direction of rotation of the shaft, in this case the fluid would be guided in the depressions, in each case radially towards the centre circle, as far as the touching point 45, and would flow out of the depression into the sealing gap relatively far away from the respective sealing circle. As a result, although the sliding surfaces would be hydrodynamically lubricated, the sealing action would be poor.

I claim:

1. Sliding ring seal for sealing the place at which a revolving shaft (1) passes through a wall (2) which separates a sealed space (31) containing a fluid from a second space (32), a higher pressure generally prevailing in the sealed space than in the second space, and the sliding ring seal having a first sealing ring (21), which is held non-rotatably against the wall and is sealed off with respect thereto and which has a planar first end face (213) lying radially with respect to the shaft axis (114) and delimited by an outer edge (211) and an inner edge (212), that the sliding ring seal furthermore has a second sealing ring (11), which is held non-rotatably against the shaft and is sealed off with respect thereto and which has a planar second end face (113) lying radially with respect to the shaft axis and delimited by an outer edge (111) and an inner edge (112), one of the sealing rings being movable in the direction of the shaft axis and being pressable against the other sealing ring, and the two end faces touching each other when the shaft is stationary and forming a narrow sealing gap (13) when the shaft rotates, the region of the sealing gap which is covered by both end faces at all times when the shaft rotates being designated a sealing zone (35), the sealing zone being enclosed by two delimitation circles whereof the centre point of each lies on the shaft axis and the radius of one delimitation circle being equal to the distance between the shaft axis and the point closest thereto of one of the outer edges (111, 211) and the radius of the other delimitation circle being equal to the distance between the shaft axis and the point furthest therefrom of one of the inner edges (112, 212), and the delimitation circle which is closer to the sealed space (31) being designated a sealing circle (33), and the delimitation circle which is closer to the second space (32)

being designated a zone circle (34), that the distance between the delimitation circles is designated the sealing zone width (B), and that in at least one of the sealing rings a plurality of depression (4) are made in the end face (113,213) thereof, a single row of depressions being disposed adjacent at least one of the sealing and zone circles, that each depression has an edge (41) which is endless on the end face and which is within the sealing zone (35), and that two edge sections are defined by the fact that the edge of each depression is touched on each side by a respective one radial line (115, 116) intersecting the shaft axis and lying in the plane of the end face, that the radial lines therefore enclose the depression, two touching points (45 and 46) each lying on one radial line which have in each case the smallest distance from the sealing circle of all the touching points lying on the same radial line dividing the edge into two edge sections and the edge section facing the sealing circle being designated a sealing section (411) and the remaining edge being designated a zone section (412), that of the two touching points (45 and 46) the one which has the smallest distance from the sealing circle is designated a return point (46), the radial line passing through the return point being designated a first radial line (116) and the other being designated a second radial line (115), that furthermore a return circle (461)is defined which passes through the return point (46) and whereof the centre point lies on the shaft axis, that a first reference face (F1) is defined which is bounded by the return circle 461, the sealing section (411) and the second radial line (115) and whereof the area is assigned a negative value where the sealing section 411 lies between the sealing circle (33) and the return circle (461) and a positive value where the return circle (461) lies between the sealing circle (33) and the sealing section (411), and that a second reference face (F2) is defined which is bounded by the return circle (461), the zone section (412) and the second radial line (115) and whereof the area is calculated positively, characterized in that at least one of the touching points has a small spacing (A) from the sealing circle which is between 0.1% and 20% of the sealing zone width (B), wherein the ratio of A/B is in the range between 0.001 and 0.2 and in that the ratio of the first reference face (F1) to the second reference face (F2) is in the range between −0.3 and +0.9.

2. Sliding ring seal according to claim 1, characterized in that the small spacing (A) is between 1% and 10% of the sealing zone width B, and in that the ratio of the first reference face (F1) to the second reference face (F2) is in the range between 0 and +0.9.

3. Sliding ring seal according to claim 2, characterized in that the ratio of the first reference face (F1) to the second reference face (F2) is in the range between +0.1 and +0.9.

4. Sliding ring seal according to claim 3, characterized in that the small spacing (A) is at most 0.5 mm.

5. Sliding ring seal according to claim 4, characterized in that the small spacing (A) is smaller than 0.2 mm.

6. Sliding ring seal according to claim 1, a centre circle (36) concentric with respect to the delimitation circles being defined, whereof the radius is equal to the arithmetic mean of the radii of the delimitation circles, characterized in that the edge (41) of each depression (4) is between the sealing circle (33) and the centre circle (36).

7. Sliding ring seal according to claim 1, characterized in that the edge (41) of a depression is mirror-symmetrical in relation to a radial line (118) and the return circle (461) consequently passes through both touching points (45 and 46).

8. Sliding ring seal according to claim 1, characterized in that the maximum depth (t) of at least one of the plurality of depressions is between 0.2 and 10 micrometers.

9. Sliding ring seal according to claim 8, characterized in that the base of at least one of the plurality of the depressions is formed at least in part by a planar face (431) inclined toward the end face (113, 213).

10. Sliding ring seal according to claim 9, characterized in that the depth of at least one of the plurality of depressions is smaller in the vicinity of at least one of the touching points (45, 46) than in the central region of the at least one of the plurality of depression.

11. Sliding ring seal according to claim 9, characterized in that the width of at least one of the plurality of depressions as measured in the radial direction is smaller in the vicinity of at least one of the touching points than in the central region of the at least one of the plurality of depressions.

12. Sliding ring seal according to claim 1, characterized in that each of the plurality of depressions (4) comprises at least two hollows (421, 422, 423) of different lengths, the respectively longer hollow having a smaller spacing from the sealing circle (33) than any smaller hollows, in that the hollows adjoin one another along parts of their longitudinal edges such that the cavities formed by the hollows and the end face plane (113, 213) merge with one another and the hollows are arranged substantially such that their longitudinal extent runs chiefly tangentially.

13. Sliding ring seal according to claim 1, characterized in that the edge of a depression comprises a polygonal figure having a straight portion.

14. Sliding ring seal according to claim 1, characterized in that the sealing section (411) is a single straight line (413).

15. Sliding ring seal according to claim 1, characterized in that the zone section (412) is a polygonal figure comprising at least two straight lines.

16. Sliding ring seal according to claim 1, the sealing circle (33) being larger than the zone circle (34), characterized in that the sealing section (411) is shorter than the zone section (412).

17. Sliding ring seal according to claim 1, the connection line between the point of intersection (117) of the shaft axis and the end face plane, and any point (40) of the zone section (412) being defined as a radius vector (110), characterized in that when the point (40) moves on the zone section (412) from one touching point (45) to the other touching point (46) the radius vector rotates in at most one direction.

18. Sliding ring seal according to claim 1, where the second space (32) also contains a fluid which has to be kept separate from the sealed space (31), that is to say the second space is also a sealed space and consequently the zone circle (34) is at the same time a second sealing circle, a second return circle (462) being defined which has the small spacing (A) from the second sealing circle, characterized in that in the case of some of the depressions (4) the return point (46) lies on the second return circle (462).

19. Sliding ring seal according to claim 1, characterized in that at least in one of the end faces (113, 213) there are further included additional depressions (51, 52) which are between 1 micrometer and 20 micrometers deep and extend radially at least as far as a sealing circle, so that any said additional depression is connected at least sometimes to a sealed space.

20. Sliding ring seal according to claim 1, characterized in that the ring in which depressions are made is of ceramic material.

21. Sliding ring seal according to claim 12, characterized in that the mutually adjoining hollows are of different depths such that the longest hollow (421) has the smallest depth and the shortest hollow (424) has the greatest depth, the cavitties formed by the hollows and the end face plane (113, 213) each merging with a step in the regions in which hollows adjoin one another.

22. Sliding ring seal according to claim 21, characterized in that in a region in which two hollows adjoin one another, the respectively less deep hollow lies closer to the sealing circle (33) than any deeper hollow.

23. Sliding ring seal according to claims 22, characterized in that the depth (h) of the shallowest hollow (421) is between 0.2 micrometers and 5 micrometers, and the height (Δh) of a step between two hollows is between 0.2 micrometers and 5 micrometers.

24. Sliding ring seal according to claims 23, characterized in that the width (b) of a hollow is between 0.05 and 0.2 millimeters.

25. Sliding ring seal according to claim 24, characterized in that the depth of at least one hollow, as seen in its longitudinal direction, lessens towards at least one of the touching points (45, 46).

26. Sliding ring seal according to claims 12, characterized in that the longitudinal edges of the hollows are straight lines.

27. Sliding ring seal according to claim 12, characterized in that at least one longitudinal edge of at least one hollow is curved, and the centre point of the curvature is outside the sealing circle (33).

28. Sliding ring seal according to claim 1, characterized in that the edge of a depression comprises a polygonal figure which has curved portions.

29. Sliding ring seal according to claim 19, characterized in that said plurality of depressions and said additional depressions are made in the sealing ring by one of a laser beam and an electron beam.

30. Sliding ring seal according to claim 29, characterized in that the depressions are made by means of the laser beam of an excimer laser.

31. Sliding ring seal according to claims 29, characterized in that at least some of the depressions are made by repeated successive irradiation of at least a portion of the projected surface of the depressions.

32. Sliding ring seal according claims 29, characterized in that mutually adjoining regions of a depression are irradiated in overlapping manner, as a result of which the partial regions irradiated in overlapping manner are deeper than the regions adjoining them.

33. Sliding ring seal according to claims 29, characterized in that a plurality of depressions are produced simultaneously by simultaneous irradiation of a plurality of locations on the sealing ring.

34. Sliding ring seal according to claim 20, characterized in that the depressions are made in the sealing surface of the sintered hard ceramic ring which has already been lapped plane.

35. Sliding ring seal according to claim 34, characterized in that the ceramic material is silicon carbide.

\* \* \* \* \*